(12) United States Patent
Kenzari et al.

(10) Patent No.: US 12,358,316 B2
(45) Date of Patent: Jul. 15, 2025

(54) ANTI-COUNTERFEITING OBJECT

(71) Applicant: CENTRE NATIONAL DE LA RECHERCHE SCIENTIFIQUE (CNRS), Paris (FR)

(72) Inventors: Samuel Kenzari, Andilly (FR); Vincent Fournee, Laître-sous-Amance (FR); Bénédicte Boy, Nancy (FR)

(73) Assignee: CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 594 days.

(21) Appl. No.: 17/626,293

(22) PCT Filed: Jul. 15, 2020

(86) PCT No.: PCT/EP2020/069936
§ 371 (c)(1),
(2) Date: Jan. 11, 2022

(87) PCT Pub. No.: WO2021/009195
PCT Pub. Date: Jan. 21, 2021

(65) Prior Publication Data
US 2022/0266622 A1 Aug. 25, 2022

(30) Foreign Application Priority Data
Jul. 18, 2019 (FR) ...................................... 1908174

(51) Int. Cl.
*B42D 25/373* (2014.01)
*B42D 25/355* (2014.01)
(Continued)

(52) U.S. Cl.
CPC ......... *B42D 25/373* (2014.10); *B42D 25/355* (2014.10); *B42D 25/45* (2014.10); *G01N 23/207* (2013.01)

(58) Field of Classification Search
CPC .... B42D 25/36; B42D 25/324; B42D 25/373; B42D 25/45; B42D 25/355; G07D 7/0043;
(Continued)

(56) References Cited

U.S. PATENT DOCUMENTS

2005/0112360 A1  5/2005  Berger et al.
2007/0071951 A1  3/2007  Grande et al.
(Continued)

FOREIGN PATENT DOCUMENTS

JP  2017-009694 A  1/2017
JP  2019-038255 A  3/2019
(Continued)

OTHER PUBLICATIONS

International Search Report from Corresponding International Application No. PCT/EP2020/069936 mailed Aug. 12, 2020.
(Continued)

*Primary Examiner* — Justin V Lewis
(74) *Attorney, Agent, or Firm* — Chrisman Gallo Tochtrop LLC

(57) ABSTRACT

The present application relates to an anti-counterfeiting object including a face with an optical identification marking which is readable by the eye and/or by a machine, and an authentication volume, the authentication volume extending from the face in the thickness (z) direction so as to be accessible from the face in order to be read by X-ray diffractometry (XRD). The authentication volume is a composite of a first material, referred to as the authentication material, and at least one second material, the authentication volume constituting a material volume of at least 5 mm³. The authentication material includes at least one amorphous phase, at least one crystalline phase and at least one complex metal phase. The second material is typically a polymer. The (Continued)

application may advantageously be implemented by 3D printing.

24 Claims, 12 Drawing Sheets

(51) Int. Cl.
   *B42D 25/36* (2014.01)
   *B42D 25/45* (2014.01)
   *G01N 23/207* (2018.01)
   *G07D 7/00* (2016.01)

(58) Field of Classification Search
   CPC ........... G07D 7/06; G07D 7/003; G07D 7/00; G01N 23/207; B33Y 10/00; B33Y 80/00; B33Y 70/00; B22D 19/00; B22F 10/28; B22F 3/26; B22F 3/1115; B22F 10/20; B22F 10/62; B22F 2207/17; B22F 2999/00; B22F 2003/248; B22F 3/115; B29C 71/0009; B29C 64/153; B29C 70/0035; C22C 1/0425; C22C 1/0483; C22C 1/08; C22C 1/0416; C22C 1/0458; C22C 1/05; C22C 29/00; B29K 2105/041; B29K 2105/246; Y02P 10/25
   USPC ........... 371/71; 283/72, 74, 94, 98, 117, 901
   See application file for complete search history.

(56) References Cited

U.S. PATENT DOCUMENTS

| | | | |
|---|---|---|---|
| 2007/0121181 A1 | 5/2007 | Moon et al. | |
| 2008/0088895 A1* | 4/2008 | Argoitia | D21H 21/40 359/2 |
| 2020/0256810 A1* | 8/2020 | Kenzari | G01N 33/204 |

FOREIGN PATENT DOCUMENTS

| | | | |
|---|---|---|---|
| WO | 2012/174232 A2 | 12/2012 | |
| WO | WO-2019011986 A1 * | 1/2019 | ......... B41F 33/0036 |

OTHER PUBLICATIONS

Written Opinion from Corresponding International Application No. PCT/EP2020/069936 dated Aug. 12, 2020.
French Search Report from Corresponding French Application No. FR1908174 mailed Mar. 4, 2020.
Yu Ping Zhang, Anti-counterfeiting method using synthesized Nanocrystalline Celluose Taggants, McGill University, Montreal, Nov. 21, 2012 (cited on p. 3).
Japanese Patent Office, Notification of Reasons for Refusal, Dated Jul. 16, 2024, Application No. 2022-502951.
"Nanotechnology and Anti-Counterfeit Innovations", published by the Technology Transfer Centre in Apr. 2016 (cited on p. 1 of the specification).

* cited by examiner

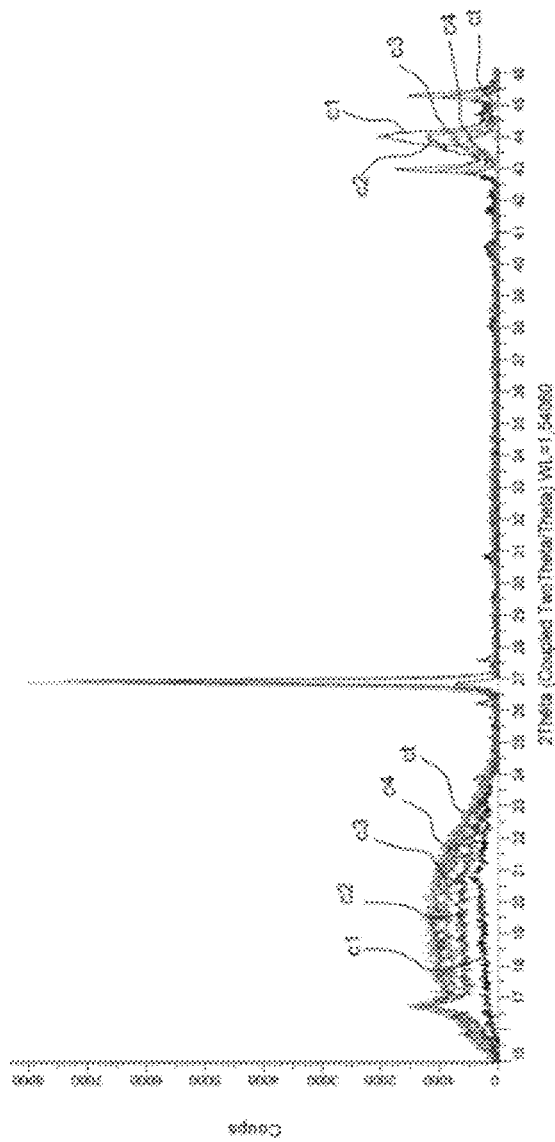
[Fig.-1]

[Fig. 2]
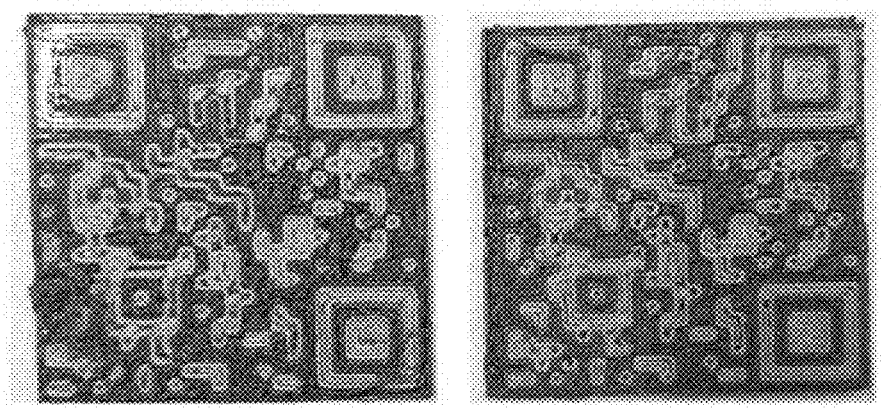

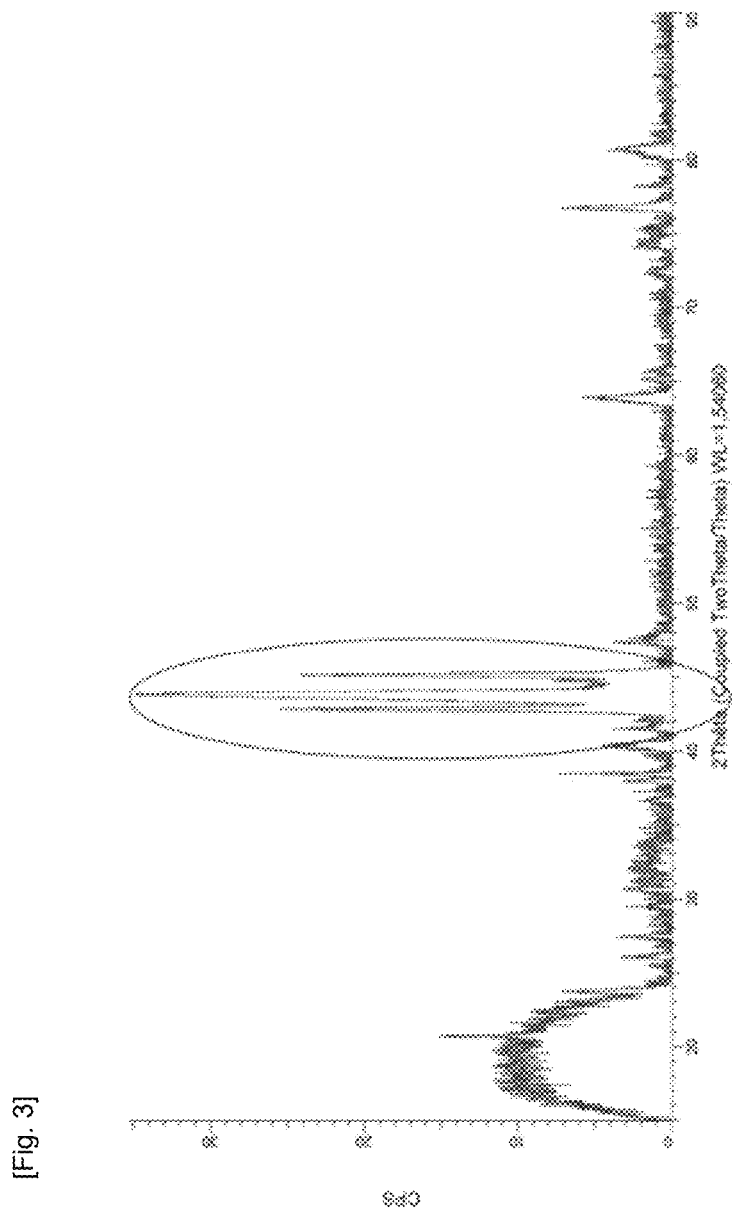
[Fig. 3]

[Fig. 4]
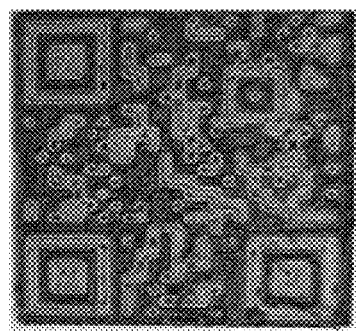 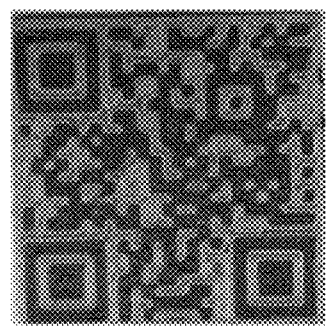
a) b)

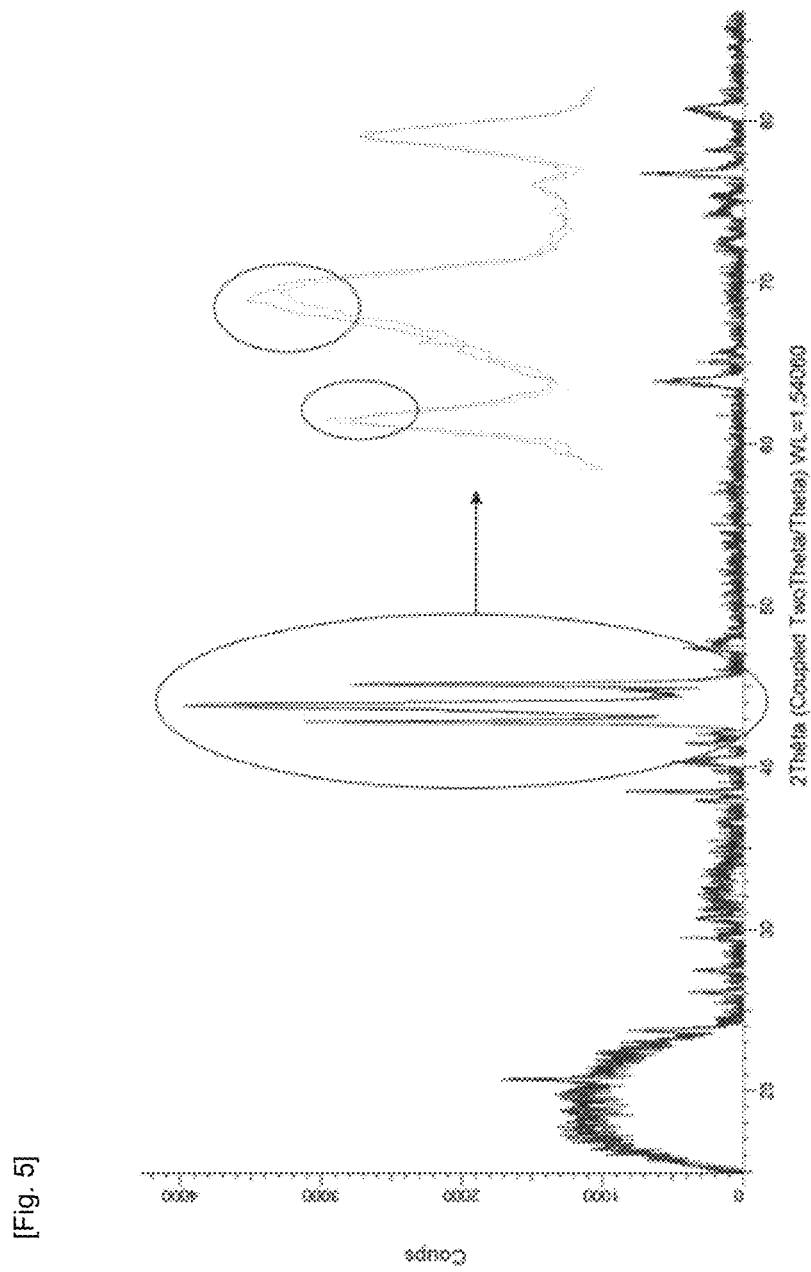
[Fig. 5]

[Fig. 6]
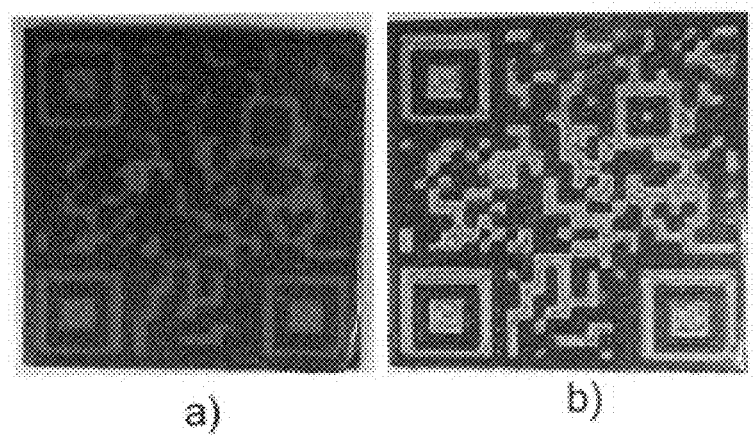
a) b)

[Fig. 7]
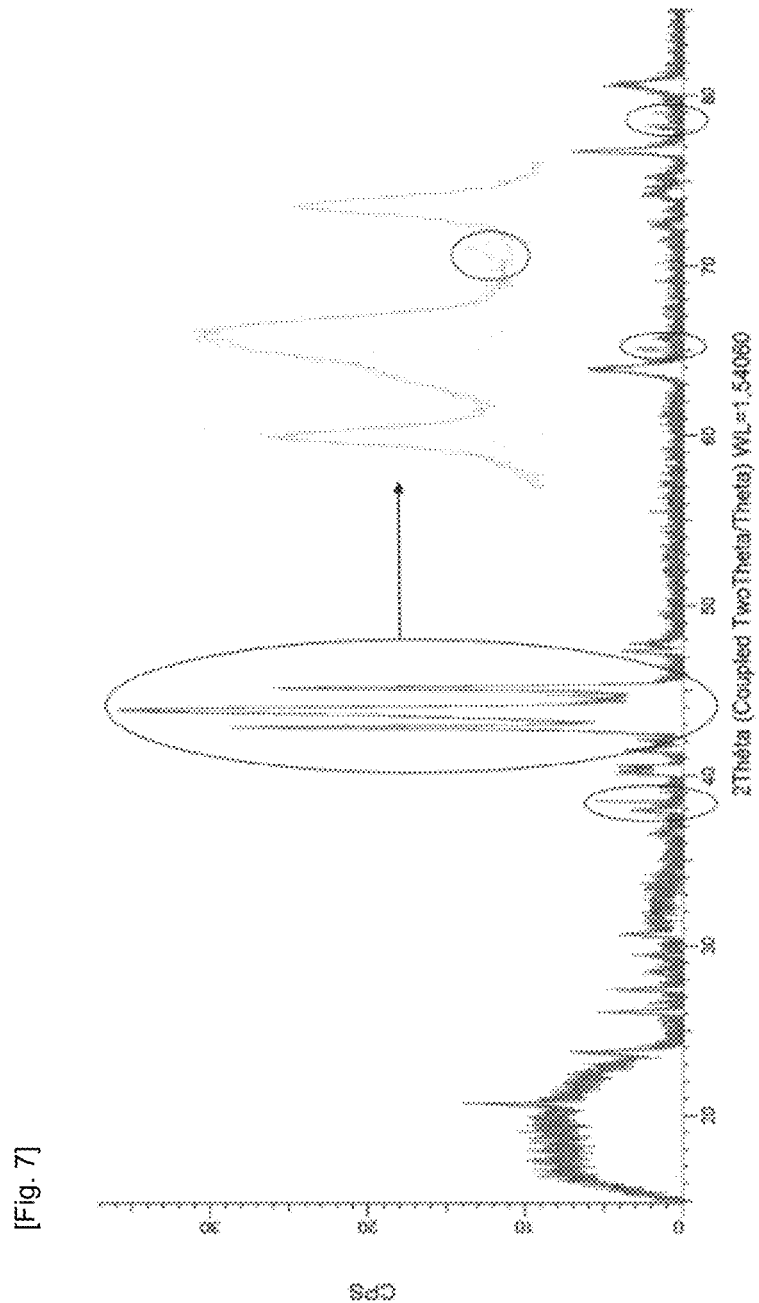

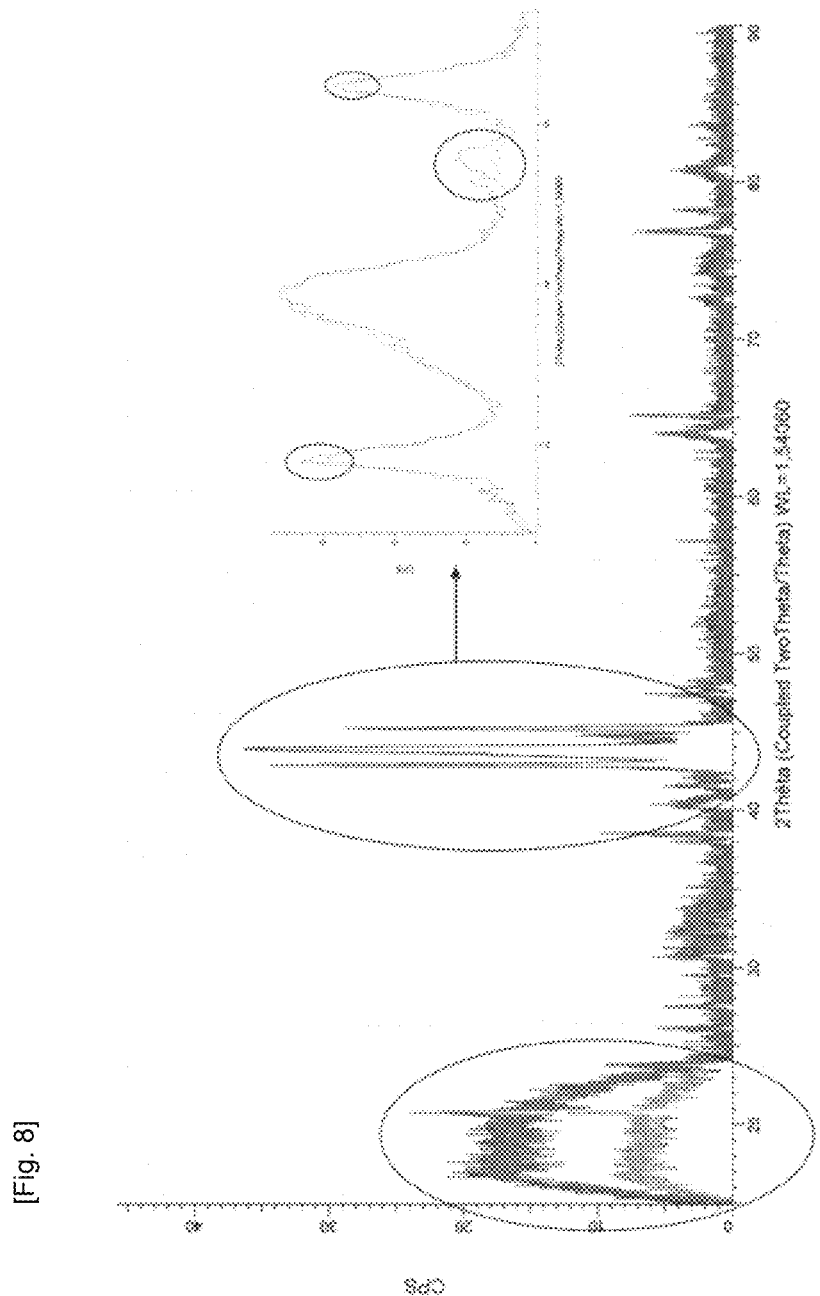
[Fig. 8]

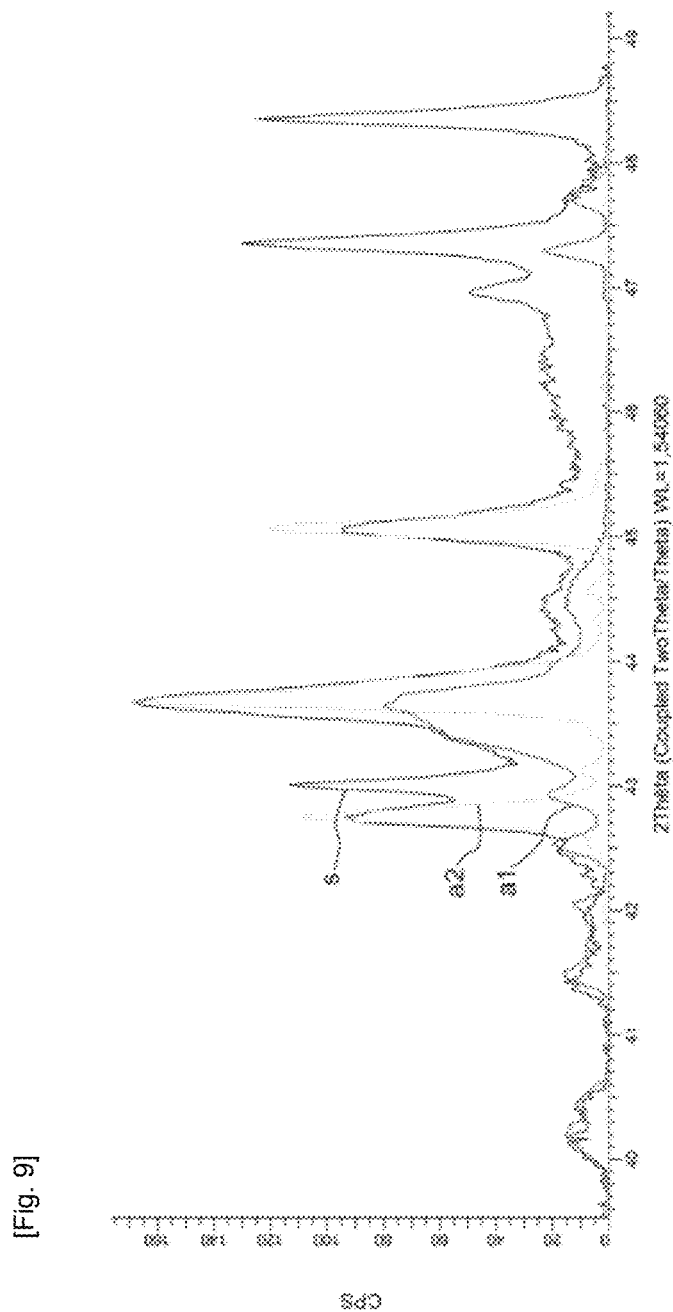
[Fig. 9]

[Fig. 10]
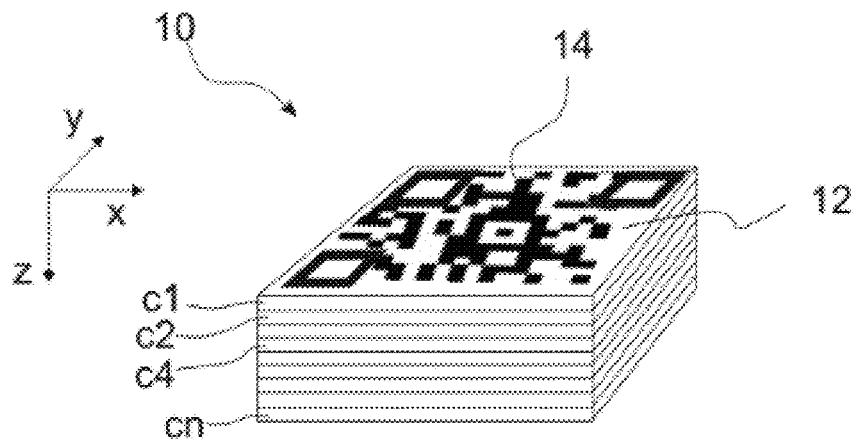
[Fig. 11]
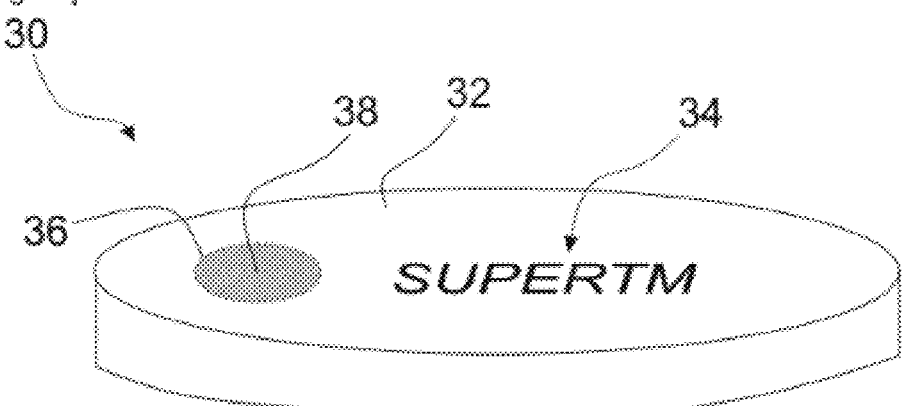
[Fig. 12]
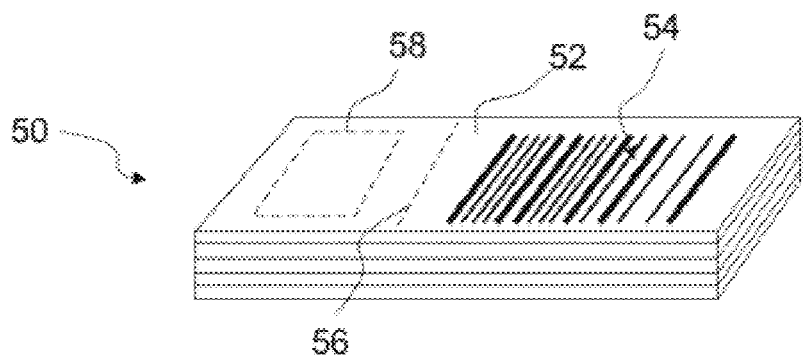

[Fig. 13]
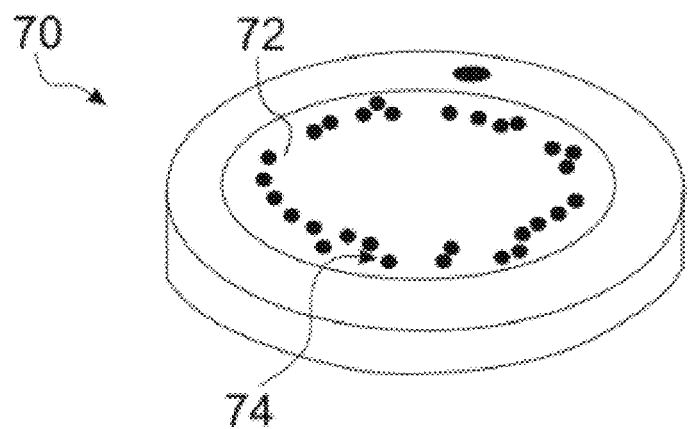

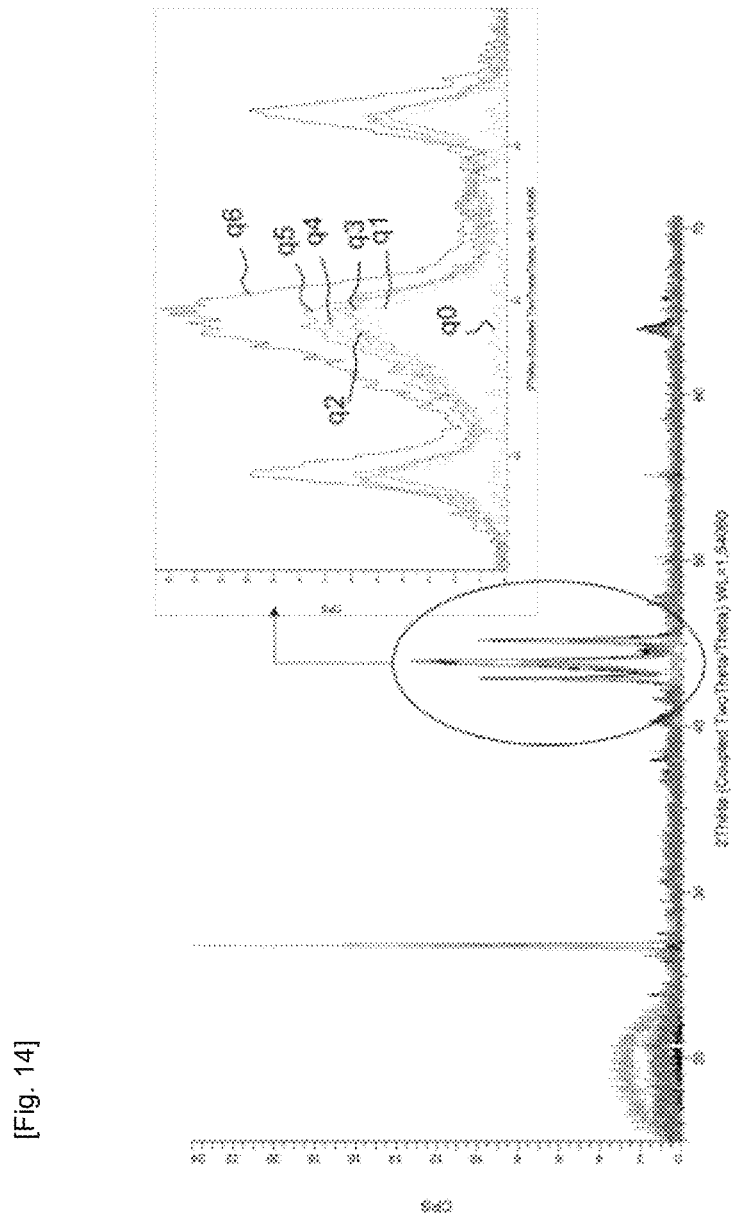
[Fig. 14]

ANTI-COUNTERFEITING OBJECT

TECHNICAL FIELD

The present invention relates generally to the fields of the identification and authentication of objects. It relates more particularly to an anti-counterfeiting object able to be authenticated more reliably.

BACKGROUND OF THE INVENTION

Counterfeiting is an ever-growing problem. For businesses, counterfeiting is a nuisance due to its impact on sales, brand value and the reputation of the business, as well as the latter's ability to benefit from technical innovations. Consumers are also victims of counterfeiting, finding themselves with bogus products despite the prices they have paid, and regarding products such as mechanical parts or drugs, products which present significant safety and health risks. At the State level, counterfeiting concerns governments due to the threat it poses to consumer well-being and health, its negative impact on innovation and the considerable resources dedicated to criminal networks, organized crime and other groups that disrupt and corrupt society.

Today, a multitude of technologies exist that may be used in combating counterfeiting. For example, nanotechnologies and other cutting-edge technologies provide access to new methods of protecting brands and monitoring and tracing products: they offer the potential for a unique "digital fingerprint" for real products (without affecting them), as well as for packaging. In this respect, the report "Nano and other Innovative Anti-Counterfeit Technologies," published by the Technology Transfer Centre in April 2016, describes more than 40 solutions, most of which were developed in the 2014-2016 period.

The current technological options for combating counterfeiting comprise a range of "open" and "hidden" measures that include product authentication and security. The anti-counterfeiting market can be primarily divided into two segments, namely authentication technologies (technologies providing visible and secret security functions); and "Track & Trace Technologies," which are technologies facilitating product visibility throughout the entire supply chain.

These technological options use serial numbers, barcodes, data systems and RFID identifiers for identification, as well as holograms, biometric solutions, watermarks and tags for security. These technologies have their own limitations on different levels and are not infallible.

One of the specific challenges of anti-counterfeiting measures is the difficulty of preventing copying of the RFID device, the marker, the hologram or any other authentication imprint.

Document US 2007/0121181 describes a method for marking an identification of an item based on an x-ray diffractometry (XRD) analysis. The method uses an identification element formed by powdered crystal materials in a binder to form an x-ray diffraction diagram representing the signature of the element when it is illuminated by an x-ray beam. The x-ray diffraction diagram represents a code, which is determined by the selection and omission of one or several of the four different crystal materials. This identification element may assume various forms (beads, cylinders, fibers) and can be used for various purposes, such as sorting, tracking, identification, verification, authentication, antitheft or anti-counterfeiting protection, security or anti-terrorism, etc.

The proposed method is interesting because it allows a large number of distinct codes and uses small objects. Furthermore, the XRD signature is readable independently of the orientation and can withstand difficult environments. Despite these advantages, the method described in document US 2007/0121181 does not appear safe enough. Indeed, x-ray diffraction is a conventional means for analyzing crystal materials. It would be relatively easy for a person skilled in the art to analyze such an identification element to detect the various crystal materials and to reproduce a compound with a very similar or identical diffractogram.

Other object authentication methods are, for example, described in documents WO 2012/174232, US 2005/0112360, US 2007/0071951 or in the article "Méthode anti-contrefaçon utilisant des marqueurs de cellulose nanocristalline synthétisée" [Anti-counterfeit method using synthetic nanocrystalline cellulose markers], by Yu Ping Zhang, Nov. 21, 2012, doctoral thesis, McGill University, Montréal.

WO2019/011986 describes an authentication method using radiocrystallography, which is safer than that described in US 2007/0121181. This method uses an authentication material that comprises at least one amorphous phase, at least one crystalline phase and at least one complex metal phase. In fact, by the x-ray crystallography analysis, such an authentication substance produces a unique diffraction diagram, forming a unique signature, or imprint, and its composition cannot be determined after the substance is manufactured. The strength of this approach lies in the impossibility of using analysis methods to reverse engineer the recipe to produce the authentication substance. The authentication is therefore done by comparison to a reference diffractogram.

In practice, a batch of the authentication substance is prepared and it is shaped, for example, into balls, cylinders, fibers, or in the form of a tag, badge or other marking means, which will be associated with an object in order to authenticate it. It is also possible to incorporate the authentication substance into the object by making the object wholly or partially from the authentication substance, or a component of the object is made from the authentication substance.

It will then be possible to authenticate the object by analyzing the tag made from the authentication material, or a part of the object made from the authentication material.

This method is very interesting owing to its tamperproof nature, due to the impossibility of using analysis methods to reverse engineer the recipe to produce the authentication substance. Nevertheless, it requires great rigor in producing the batch, so as to maintain the homogeneity thereof, and therefore to guarantee an identical signature for all of the products manufactured from the batch. Furthermore, the x-ray analysis method is inherently a hidden method, and it is not always obvious whether the object is an anti-counterfeiting object. Lastly, it is necessary to keep a database with the reference XRD signatures.

OBJECT OF THE INVENTION

The present invention aims to propose another concept for an anti-counterfeiting object able to be authenticated by x-ray diffraction, which does not have the aforementioned drawbacks.

BRIEF DESCRIPTION OF THE INVENTION

According to a first aspect, the present invention proposes an anti-counterfeiting object comprising a face with an optical identification marking which is readable by the eye and/or by a machine, and an authentication volume, said authentication volume extending from the surface of the object, from the same face or another face of the object, in the thickness direction of the object (or depth—relative to the face) so as to be accessible in order to be read by x-ray diffractometry (denoted XRD). The authentication volume comprises a non-miscible mixture of a first material, referred to as the authentication material, and at least one second material. The authentication material comprises: at least one amorphous phase, at least one crystalline phase and at least one complex metal phase.

The term "authentication volume" refers to a volume of the body of the object, which may assume various forms, the body having an outer surface that comprises the face bearing the identification marking and from which the authentication volume extends. The authentication volume may be located below the face that bears the identification marking, or below another face.

The authentication volume has a predetermined volume that is determined based on the sensitivity of the selected XRD technique, and for a recording time between one or several hours to one to two days. The authentication volume therefore represents a minimum volume of continuous material of the object that combines the first and the second material so as to allow detection by the chosen XRD method. Preferably, the predefined volume is at least 5 mm$^3$, in particular at least 10 mm$^3$.

The present invention completes the anti-counterfeiting measures by proposing an approach that associates an optical identification marking and an authentication volume with the object to be authenticated. The identification area is intended to be read by an optical reading means (generally automated), and is in particular visible by looking at the object. While the identification area is on the surface of the object, the authentication volume extends in the volume of the body of the object, and requires x-ray analysis over a given volume of material.

Since the authentication volume is not necessarily visible/discernible by the eye, and does not necessarily extend in the entire object, the authentication volume can be identified by a marking, which therefore indicates the authentication area where the XRD analysis is to be done. It may be a specific marking, intended solely to identify the authentication area. However, the identification and authentication areas may advantageously be positioned near one another (juxtaposition), and may even be partially or wholly superimposed, in which case the identification marking also serves as marking indicating the authentication area. In the case of superposition (at least partial), the measurement of the XRD signature is therefore done from the face bearing the identification marking.

It will be understood that the authentication is based on the combination of the authentication material with a second material, which generates an XRD signature resulting from the combination of the emissions of the two materials. The specific signature of the second material is in fact combined with that of the first material, to give a composite XRD signature, based on the distribution of the authentication material in the analyzed authentication volume, in particular its quantity and its spatial position (in x, y and z). In fact, the XRD analysis being sensitive over a certain depth (typically of the order of a millimeter), it is possible to act on the distribution along the Z-axis (depth) to define and modulate the XRD signature of the authentication volume.

The object according to the invention therefore constitutes an object that can be qualified as "anti-counterfeiting" due to its use, and which is itself "anti-copying," since it cannot be reproduced.

Preferably, the authentication volume extends, from the face with the identification marking, over a depth between 0 and 1.5 mm, preferably between 0 and 1 mm, more preferably between 0 and 600 μm, or 0 to 400 μm.

The authentication material can be present on the surface and/or distributed in the depth.

According to variants, the authentication volume extends over a surface, taken in a plane substantially parallel to said face of the object, of at least 10 mm$^2$, preferably at least 100 mm$^2$.

For ease of language, in the present text, the term "matter" will be used as a synonym for material.

In the present text, the term "XRD signature" refers to at least part of the diffractogram (x-ray diffraction diagram) corresponding to a given sample (reference or candidate), and which contains the characteristic values of the XRD analysis. The XRD signature can, in general, be represented graphically or as a data set. Furthermore, the authentication can be done over the entire diffractogram, or over one or several parts thereof. In practice, the XRD signature comprises a set of characteristic pairs of the diffractogram (angle; intensity), representative of the analyzed sample.

The identification marking can assume a variety of forms and can be readable under visible light or under a predefined light (e.g. infrared). The identification marking can comprise numbers and/or letters, which may or may not represent a code, or any types of indices representing a code, e.g. bars, dots, circles, squares, etc. It is in particular possible to use one- or two-dimensional codes, codes of the type: barcode, QR code, matrix code, circular code (e.g. "bleam" type), etc. The identification marking represents information that can be of different natures, in particular information relative to the nature of the object, for example its name, manufacturer reference, regulatory data, etc., as well as combinations thereof.

According to variants, the optical identification marking is done from two materials, each having a different color.

The identification marking is a two-color matrix marking, a surface layer being made from the first and the second material, each having a different color.

According to variants, the identification marking comprises a series of marks that are representative of a code delimited by a peripheral line, the authentication volume being located inside the contour of this peripheral line.

The authentication of the object is done by comparison between the measured XRD signature and a reference XRD signature, in an automated or assisted manner, based on graphs and/or numerical values. In general, the measured and reference XRD signatures are considered to match when the angular positions and intensities are identical or similar (within a defined tolerance limit). Thus, comparing the XRD signatures primarily involves comparing the angular positions of the characteristic/representative peaks and/or comparing the relative intensities of the characteristic/representative peaks.

The reference XRD signature can be stored, for example in a database, locally or online. It is of course possible to keep a control sample, from which the reference XRD signature can be measured.

Remarkably, the optical identification marking can comprise information relative to the XRD signature that must be obtained when the authentication volume is subject to the XRD analysis. The authenticity of the object is then verified by comparing the XRD signature measured for the authentication volume to the XRD signature encoded in the information marking.

One significant advantage of this approach is therefore that a reference XRD signature is encoded in the identification marking, and that it is not necessary to access an online database, or even to maintain it, to obtain the reference XRD signature.

It will be noted here that in the case where the authentication volume is spaced apart from the identification marking, for example if the authentication volume is located below a face other than the face bearing the identification marking, it is possible to encode information in the identification marking relative to the position of the authentication volume within the object, therefore for example measurement coordinates to perform the XRD analysis, indicating the location of the measurement zone.

Furthermore, while the use of XRD pertains to so-called hidden anti-counterfeiting methods (like in WO 2019/011986), the present invention proposes an approach combining optical identification and XRD authentication, in which the authentication area is preferably marked such the location in which the XRD measurement must be performed is known. This is therefore particularly interesting because the quantity of authentication material can be is [sic] reduced to what is necessary for the authentication.

It is recalled that the authentication material used in the invention, similar to that described in WO2019/011986, produces a unique x-ray diffractogram, constituting a unique signature. Its composition cannot be determined after production. The current analysis techniques do not allow the qualitative and quantitative analysis of the individual materials making up the authentication material. In particular, chemical analysis does not allow the decryption of a composition to which a given diffractogram corresponds. The elementary analysis of the various crystal structures and phases that are present is done without distinction. XRD analysis is also incapable of determining the composition of the authentication material, since it does not provide access to the volume fractions of the different phases.

Due to the x-ray absorption phenomenon and the overlap of the diffraction peaks of the different crystal and complex phases of the metal alloys, it is impossible to precisely determine the volume fractions of the different phases comprised in the authentication volume.

The invention also allows material savings, since unlike WO 2019/011986, the XRD signature results from a combination between the authentication material and the second material, which can be any material and above all does not contain the specific combination of phases of the authentication material. The second material can therefore be less expensive both in terms of purchase cost and implementation. This is particularly interesting because the composite XRD signature can be varied by varying the ratio between the two materials. In variants, the second material is predominantly present, in some cases forming a matrix, but in other variants the authentication material may be predominantly present.

In principle, the second material may be any material, polymer, wood, fiber, metal, etc. In general, the second material has a specific XRD signature that is different from that of the authentication material. The second material preferably has a polymer base, for example with one or two components, filled composite, elastomers, silicone, etc. The second material could in turn be an anti-copying material. The invention could also be made with more than one second material, respecting the same criterion of having a different XRD signature from the authentication material.

The respective volumes and spatial arrangements (in the authentication volume) of the first and second materials can be varied by design, based on the signatures that one wishes to build. It is possible to have between 1 and 99% of authentication material in the authentication volume, the rest being completed by the first material. The authentication volume preferably contains at least 10% of authentication material.

The shape of the object is limited only by the minimum volume required for the XRD analysis. It may assume all types of shapes. It is possible to produce large objects. However, the invention is particularly well suited to producing the object in the form of a tag, plate, stamp, strip, panel, label, stamp, badge, etc.

The object can be designed such that the authentication volume is uniformly present in its entire volume, or only over a portion thereof. In the latter case, the authentication volume is adjacent to, and/or (partially) superimposed with, the identification area. Here, "superimposed" means that the authentication volume, seen along the direction of the thickness, is located at least partially below the identification area (resp. the signs of the identification marking).

According to variants, the optical identification marking and the authentication volume are superimposed at least partially (seen in the direction of the thickness).

In certain applications, the authentication volume can be attached on/in a support part, the assembly of the two forming the anti-counterfeiting object.

The anti-counterfeiting object according to the invention can be made using any appropriate technology.

In general, the first and second materials are prepared independently of one another. They are next combined to produce an entire part or a portion of a part, and therefore in particular to form the authentication volume. The first and second materials are thus combined in the authentication volume, by associating them and/or juxtaposing them and/or superimposing them, so as to obtain a distribution in the space inside the volume. This distribution in the space determines the composite signature of the authentication volume.

The first and second materials are added independently using any appropriate techniques, simultaneously or successively to form this combination in the authentication volume (with a given spatial distribution). Examples include the methods for implementing polymers such as injection (bi-material co-injection), extrusion (coextrusion) methods. However, production by stratification, therefore by assembly of layers, is also included. Additive construction from two different threads, one with the first material and the other with the second material, is of course also included.

Additive manufacturing techniques are of particular interest due to their flexibility and ease of implementation. Furthermore, they allow very precise control of the deposition of material, and therefore allow mastery, layer by layer, of the deposition of material. 3D printing therefore makes it possible to master the combination, as desired, between the authentication material and the second material (or other materials), in the plane of the layer but also in the depth. The fusion deposition modeling (FDM) technique is particularly interesting to implement with two (or more) different filaments, one of which contains the authentication material.

To this end, it will be noted that it is possible to produce threads of authentication material having very good homogeneity.

According to variants, the object is made up of a plurality of superimposed layers formed by 3D printing, at least one of the layers located at a depth between 0 and 0.6 mm from the surface comprising at least part of the authentication material.

As is clear to one skilled in the art, similar X characterization techniques will advantageously be used (in particular the same x-ray sources) so as to be able to compare diffractograms of different objects.

In the present text, the term "amorphous phase" is used in its conventional meaning, generally referring to nonperiodic three-dimensional structural arrangements, not having the long-range order that is characteristic of crystals. Typically, in an amorphous phase, the x-rays will be diffused in a plurality of directions, which results in poorly defined wide peaks.

In the present text, the term "crystalline phase" is used in its conventional meaning in crystallography, referring to a crystalline structure, that is to say, an orderly arrangement of atoms, ions, molecules, forming a symmetrical pattern that repeats periodically in the main directions of the three-dimensional space of the material. In the present text, the term "crystalline phase" thus covers the historical definition of crystals, but does not cover the "quasi-crystals," or more generally the "complex metal alloys," defined below. Crystalline phases have a diffractogram characterized by a set of discrete and intense peaks.

In the present text, the term "complex metal alloy" refers to an alloy that is either a quasi-crystalline phase strictly speaking, or an approximant phase. Quasi-crystalline phases strictly speaking are phases having symmetries of rotation that are normally incompatible with the symmetry of translation, that is to say, symmetries with an axis of rotation of order 5, 8, 10 or 12. Examples include the icosahedral phase having an icosahedral group symmetry and the decagonal phase having a decagonal group symmetry.

The approximant phases or approximant compounds are true crystals inasmuch as their crystallographic structure remains compatible with the symmetry of translation, but which have, in the electron diffraction snapshot, diffraction figures whose symmetry is close to asymmetry of order 5, 8, 10 or 12. These are phases characterized by an elementary mesh containing several tens, or even several hundreds of atoms, and the local order of which has nearly icosahedral or decagonal symmetry arrangements similar to the parent quasi-crystalline phases. The complex metal phases have a powder diffractogram characterized by a dense set of discrete and intense peaks, significantly more complex than conventional metal alloys.

Among these phases, examples include the orthorhombic phase $O_1$ characteristic of an alloy having atomic composition $Al_{65}Cu_{20}Fe_{10}Cr_5$, the mesh parameters of which in nm are: $a_0^{(1)}=2.366$, $b_0^{(1)}=1.267$, $c_0^{(1)}=3.252$. This orthorhombic phase $O_1$ is said to be approximant of the decagonal phase. The nature of the two phases can be identified by transmission electron microscopy.

The rhombohedral phase can also be cited with parameters $a_R=3.208$ nm, $\alpha=36°$, present in the alloys with atomic composition close to $Al_{64}Cu_{24}Fe_{12}$. This phase is an approximant phase of the icosahedral phase.

It is also possible to cite orthorhombic phases $O_2$ and $O_3$ with respective parameters in nm $a_0^{(2)}=3.83$, $b_0^{(2)}=0.41$, $c_0^{(2)}=5.26$; and $a_0^{(3)}=3.25$, $b_0^{(3)}=0.41$, $c_0^{(3)}=9.8$, present in an alloy with atomic composition $Al_{63}Cu_{17.5}Co_{17.5}Si_2$; or the orthorhombic phase $O_4$ with parameters in nm $a_0^{(4)}=1.46$, $b_0^{(4)}=1.23$, $c_0^{(4)}=1.24$, which forms in the alloy having atomic composition $Al_{63}Cu_8Fe_{12}Cr_{17}$.

It is also possible to cite a phase C, of cubic structure, very often observed coexisting with the approximant or true quasi-crystalline phases. This phase, which forms in certain Al—Cu—Fe and Al—Cu—Fe—Cr alloys, consists of a superstructure, by chemical effect of the alloy elements relative to the aluminum sites, a structure phase of the Cs—Cl type and with lattice parameter $a_1=0.297$ nm. A diffraction diagram of this cubic phase has been published for a pure cubic phase sample with atomic composition $Al_{65}Cu_{20}Fe_{15}$ by number of atoms.

An H phase of hexagonal structure may also be cited that derives directly from the C phase, as demonstrated by the epitaxy relationships observed by electron microscopy between crystals of the C and H phases in the simple relationships that link the parameters of the crystalline lattices, namely $aH=3\sqrt{a1}/\sqrt{13}$ (to within 4.5%) and $cH=3\sqrt{2} \cdot a\sqrt{2}$ (to within 2.5%). This phase is an isotype of a hexagonal phase, denoted $\phi AlMn$, discovered in Al—Mn alloys containing 40% by weight of Mn.

The cubic phase, its superstructures and the phases derived therefrom, constitute a class of approximant phases of the quasi-crystalline phases of adjacent compositions.

The quasi-crystalline alloys of the Al—Cu—Fe system are also appropriate for implementing the present invention. In particular, alloys may be cited that have one of the following atomic compositions: $Al_{62}CU_{25.5}Fe_{12.5}$, $Al_{59}Cu_{25.5}Fe_{12.51}B_3$, $Al_{71}Cu_{9.7}Fe_{8.7}Cr_{10.6}$, and $Al_{71.3}Fe_{8.1}Co_{12.8}Cr_{7.8}$. These alloys are for example marketed by the company Saint-Gobain (or Sigma-Aldrich). In particular, alloy $Al_{59}Cu_{25.5}Fe_{12.5}B_3$ is sold under the name Cristome F1 alloy $Al_{71}Cu_{9.7}Fe_{8.7}Cr_{10.6}$ is sold under the name Cristome A1 and alloy $Al_{71.3}Fe_{8.1}Co_{12.8}Cr_{7.8}$ is sold under the name Cristome BT1.

Alloys Cristome A1, F1 and BT1 are cited solely as examples.

The complex metal alloys usable in the context of the invention can be metal alloys comprising an atomic percentage of aluminum greater than 50%.

According to another aspect, the invention relates to a method for manufacturing an anti-counterfeiting object, wherein said object is made by additive construction using: a filament of authentication material comprising at least one amorphous phase, at least one crystalline phase and at least one complex metal phase; and at least one polymer-based filament of a different color. The manufacturing is done by printing successive superimposed layers. The surface layer is printed so as to form an identification marking. The method is implemented such that the material of the filament of authentication material is deposited in the surface layer and/or in one or a plurality of layers below the surface layer so as to form an authentication volume.

According to another aspect, the invention relates to a method for authenticating an anti-counterfeiting object as disclosed in the present application, comprising the following steps:

reading the identification marking of the anti-counterfeiting object using a reading instrument in order to obtain information;

analyzing, by x-ray diffractometry, XRD, the authentication area of the anti-counterfeiting object in order to determine its XRD signature; and comparing the XRD signature of the anti-counterfeiting object with a reference XRD signature.

The identification marking typically takes the form of a one- or two-dimensional code. It is advantageously read automatically using a reader.

The XRD signatures are preferably compared with computer assistance.

The reference XRD signature can be obtained by accessing a local or online file or database. In this case, the identification marking can comprise the address, URL or hyperlink allowing access to the XRD signature.

Alternatively, information relative to the reference XRD signature can be encoded in the identification marking. This is information relative to the diffractogram corresponding to the reference XRD signature, for example characteristic peaks identified by the (angle, intensity) pairs, optionally completed by the indication of the wavelength of the x-ray source.

DETAILED DESCRIPTION USING THE FIGURES

Other particularities and features of the invention will emerge from the detailed description of at least one advantageous embodiment presented below, as an illustration, in reference to the appended drawings. These drawings show:

FIG. 1: an XRD diffractogram corresponding to example 1;

FIG. 2 a view of two identical QR codes according to example 2-A;

FIG. 3: an XRD diffractogram corresponding to example 2-A;

FIG. 4 a view of two QR codes according to example 2-B;

FIG. 5: an XRD diffractogram corresponding to example 2-B;

FIG. 6: a view of two QR codes according to example 3-A;

FIG. 7: an XRD diffractogram corresponding to example 3-A;

FIG. 8: an XRD diffractogram corresponding to example 3-B;

FIG. 9: an XRD diffractogram corresponding to example 4;

FIG. 10: an embodiment of the invention in the form of a QR code tag;

FIG. 11: an embodiment of the invention in the form of a tag bearing a barcode;

FIG. 12: an embodiment of the invention in the form of a tag; and

FIG. 13: an embodiment of the invention in the form of a pin bearing a circular code;

FIG. 14: an XRD diffractogram corresponding to example 5.

A) EXAMPLES

Several examples have been done so as to illustrate the principle of the invention. Examples 1 to 3 use tags or chips having a pattern of the QR code type. These chips are made using a conventional 3D printer of the FDM type and using two filaments with a diameter of 1.75 mm. One of the filaments is the authentication material (material comprising at least one amorphous phase, at least one crystalline phase and at least one complex metal phase) and the other filament has a polymer base that has a specific XRD signature different from the other filament, for example PLA (polylactic acid).

The XRD measurements were done on a D8 Advance apparatus by Bruker, in the theta/2theta Bragg Brentano configuration, with a copper anode x-ray tube. The measurement is done over an angular range of 15 to 90°, with a measurement pitch of 0.018627795°, for a total scan time of 55 min 50 s.

Example 1

For this example, samples are produced, by filament deposition (FDM), in the form of "chips" with a thickness of 1 mm and a diameter of 25 mm, or 10 successive layers with a thickness of 100 µm. To this end, two threads are used, corresponding to two different materials: one is the authentication material, and the other is a conventional PLA. The filament of authentication material here comprises: 50 m % of an amorphous phase given by the PLA, 25 m % of a crystalline phase, and 25 m % of a mixture of quasi-crystalline icosahedral phase and an approximant phase. The approximant and complex alloys are alloys of the Al—Cu—Fe system with the appropriate addition elements (chromium or boron, as explained above).

A first control sample is produced, made up of 10 layers of PLA.

Next, 9 other samples are produced, in which 9 layers of PLA are deposited, as well as a single layer made up of 100% authentication material. For these 9 layers previously described, the position of the layer of 100% authentication material is varied, from the first layer (top layer of the chip), to the tenth and final layer (bottom layer of the chip). All of the samples are next analyzed (analysis by the top face) using the XRD method to obtain their characteristic signature.

FIG. 1 shows the diffractogram obtained for the control sample ct and samples c1 to c4, the authentication layer of which is respectively located at depths 0-100 µm, 100-200 µm, 200-300 µm and 300-400 µm. As can be seen, the XRD signatures of samples c1 to c4—resulting from the coupling of the authentication material and PLA—are different from one another, and different from the signature of the control sample ct.

Thus, the analyses reveal that modifying the position of the layer of authentication material modifies the obtained signature up to about 600 µm, or to the 6th layer. Beyond this step, the signature of a composite chip again becomes very close or identical to that of the control chip. It is therefore possible to consider that the composite signature can be measured effectively up to 600 µm, which represents a detectability limit for the chosen XRD analysis conditions.

This first example makes it possible to conclude that the XRD signatures are controllable in an object based on the position of the authentication material along the Z-axis, therefore based on the depth.

Example 2

This example aims to study the repeatability of the authentication measurement. A QR code including two colors is generated, and it is printed using a PLA filament for one color and an authentication filament for the other. One thus has a black and light gray QR code, the black corresponding to the authentication filament and the light gray to the PLA filament.

i) Manipulation 2-A. Two QR codes are printed that are identical in terms of pattern and in terms of filaments used. They are shown in FIG. 2. The XRD signatures obtained after analyses are identical, cf. FIG. 3. These results confirm that for a same pattern, the distribution of the materials being identical, the same authentication signature is obtained. The signatures are therefore reproducible for an identical identification area.

ii) Manipulation 2-B. Secondly, the same pattern is still kept, and its colors are reversed. A second QR code is printed, but the light gray replaces the black and vice versa, as illustrated in FIG. 4. The obtained signatures prove to be very close and difficult to tell apart, cf. FIG. 5. Indeed, when the distribution of the two colors is similar, e.g. 50/50 in surface distribution, the concentration of the two materials is the same before and after reversal of the colors.

It is therefore possible to create two different patterns but with similar distributions of materials (colors), and therefore to have two identical XRD signatures for two different identification information items.

It is therefore possible to conclude that the XRD signatures are reproducible for a different identification area.

Example 3

This example demonstrates the possibility of modifying the signature while keeping the same identification pattern.

i) Manipulation 3-A. The first manipulation (2-A) of example 2 is repeated, varying the PLA filament used, changing the color and opaqueness (example: red in place of the light gray). The black is therefore done with the authentication material filament. The QR codes are shown in FIG. 6.

For two QR codes with the same pattern, therefore including the same information, two different signatures are obtained; see FIG. 7. Therefore, for a same item of identification information, the authentication changes: the XRD signatures are different for an identical identification area.

ii) Manipulation 3-B. Next, two QR code chips are printed with identical first layers (same pattern, same materials, etc.). This time, one intervenes only on the lower levels to modify the authentication volume information while keeping the same identification information (because same surface pattern). The composition of each layer is indicated in the table below, having noted that layers 2, 3 and 4 are different between the two manufactured chips.

The diffractogram of the two chips is shown in FIG. 8. As can be seen, the signatures are different for an identical identification area. This example therefore demonstrates the possibility of modifying the XRD signature for the same identification information.

TABLE 1

|         | 1                                              | 2   |
|---------|------------------------------------------------|-----|
| Layer 1 | A.M. = Authentication Material {Polymer + LAM} + PLA | |
| Layer 2 | A.M.                                           | PLA |
| Layer 3 | A.M.                                           | PLA |
| Layer 4 | A.M.                                           | PLA |

Example 4

Unlike the previous examples, this example does not use 3D printing, but screenprinting (ink deposition).

A mixture is produced of screenprinting ink {active material (Ag, C, dielectric powder, etc.)+epoxy, acrylic, polyimide or phenolic resins} and additives/powders of authentication material. Next, a mask is made from a sheet of PET (thickness~130 µm) in which the desired pattern is cut (e.g. a disc) using a laser cutting machine.

The substrate subsequently used for the screenprinting is of the same nature as the mask: a PET sheet of about 130 µm.

After producing our object by screenprinting, an authentication deposition is therefore obtained of about 130 µm on a PET substrate. This multilayer sample (PET/Authentication deposition) has a unique XRD signature.

Three materials were analyzed, one of which was prepared according to this protocol:
- a1: complex metal alloy 1, in powder form
- a2: complex metal alloy 2, in powder form
- s: sample prepared by screenprinting, with a PET substrate and an ink containing authentication powder, both of which making up a1 and a2 (two complex metal alloys)

The diffractogram of each of the samples is shown in FIG. 9.

The XRD analysis of the sample done by screenprinting allows an XRD signature to be detected allowing the authentication of the sample.

Example 5

This example seeks to determine the separation threshold of two identification patterns.

This example is based on an area analyzed during an XRD analysis of 1 cm$^2$, as well as the limit resolution of a basic FDM printer equipped with a nozzle having a diameter of 0.4 mm: order of magnitude of 1 mm. Thus, slabs are produced of 1 cm$^2$ and 1 mm thick, gridded using 100 small cubes measuring 1 mm$^3$.

The objective is to verify the threshold, in terms of volume (therefore 1 mm$^3$ cubes), from which the signature is modified sufficiently to be detected with the present XRD analysis equipment.

Different slabs are then produced, one with 100% cubes printed using the PLA filament, one with 100% cubes printed using the authentication filament, then one slab with 50 cubes from PLA and 50 from authentication material (A.M.). Lastly, from this last 50/50 slab, 4 other slabs are produced where this distribution is varied by modifying the composition of one or two cubes (e.g. 51 cubes from PLA and 49 from authentication material, 1 cube of which goes from the composition of the authentication material to PLA).

After XRD analysis, it appears that the modification of the composition of 1 to 4 cubes out of 100 cubes (or 1 to 4% volume in composition variation) does not make it possible to obtain separable XRD signatures.

Thus, the same protocol is repeated, this time increasing the pitch. The slabs are of the same dimensions, but they are gridded into 5×5 cubes of 4 mm$^3$, or slabs of 25 cubes. When the composition of a single cube is modified, this then represents 4% volume variation of the composition.

The XRD analyses show that a pitch of 2 cubes of 4 mm$^3$, or 8% volume variation of the composition, makes it possible to obtain two different signatures. This discretization threshold is clearly illustrated in FIG. 14, which shows the diffractogram's for the various slabs produced, namely: q0=100% PLA, q1=42% A.M., q2=46% A.M., q3=50% A.M., q4=54% A.M., q5=58% A.M. and q6=100% A.M. As clearly shown, a difference of 8% volume for the up authentication material is sufficient to differentiate the XRD signatures (e.g. between q3 and q5).

B) EMBODIMENTS

The operating principle of the invention having been demonstrated based on the previous examples, we will now describe, using FIGS. 10 to 13, several possible embodiments of the present anti-counterfeiting object, here in the form of chips, which may also be called plates or tags.

Each of the objects 10, 30, 50 and 70 comprises a face 12, 32, 52 and 72 that bears an identification area having an identification marking 14, 34, 54 and 74. All the identification markings are visible here to the naked eye, under normal conditions.

The face 12, 32, 52 and 72 extends in the examples in a plane parallel to (x,y), and the direction of the thickness is therefore that of the Z-axis, typically perpendicular to (x,y).

Each object comprises an authentication volume extending from the face 12, 32, 52 and 72 in the direction of the thickness (along the Z-axis) so as to be accessible for reading by x-ray diffractometry, XRD. The authentication volume is a composite of a first material, referred to as the authentication material, and at least one second material. The authentication material comprises at least one amorphous phase, at least one crystalline phase and at least one complex metal phase.

The authentication material has an XRD signature that cannot be falsified, since the use of complex metal phases makes qualitative and quantitative analysis impossible.

The second material is used to obtain a composite signature, resulting from the combination of the two materials in the analysis volume, and which is therefore different from that of the XRD signature of the first material alone.

The authentication volume is thus a composite volume of the first and second materials. Both materials are present in this volume, but the first and second materials are not miscible. The authentication volume therefore comprises volumes of the first and the second material.

As is understood from the figures, the authentication volume is associated with the identification marking. The identification marking constitutes a visible surface marking, while the authentication volume is a non-visible marking that extends in the volume. In general, the authentication volume is placed near or superimposed at least partially with the identification marking (seen in direction z).

An operator who knows the construction of this type of object knows that he can authenticate the object by analyzing the authentication volume by XRD analysis at an area to be attacked from the surface 12, and which is located near the marking area or superimposed therewith (partially or wholly).

Conventional 3D printing technology of the FDM type (deposition of molten material) is particularly interesting because it allows mastery of the combination of material by for example using a thread of the authentication material and a thread of the second material, e.g. with a polymer base. The resolution of conventional 3D printing will allow depositions in layers or strata, by choosing the positioning of the materials both in the plane (X, Y) as well as the thickness (Z) of the object. The distribution of material is therefore fully mastered in the authentication volume, with good precision, which allows excellent reproducibility of the construction. Mastering the deposition will also make it possible to master different constructions of the authentication volume (ratios and positions in X-Y-Z).

FIG. 10 shows a coordinate system (X, Y, Z); the layers are parallel to the plane X, Y and stacked along the Z-axis (this is therefore the axis of the thickness). The thickness of a layer is for example about 100 µm, but may typically vary in between [sic] 20 and 300 µm with conventional printers.

The object of FIG. 10 is a QR code chip, which has a parallelepipedal body. The surface layer is obtained by printing with two PLA threads of different colors, so as to form the desired QR code. The surface layer C1 rests on a plurality of printed layers C2 to Cn made from PLA, except one layer, e.g. C4, which is printed entirely with the authentication material. There is therefore a layer of authentication material that extends at a given distance below the surface, but within the XRD detection limit (preferably <600 µm). During the XRD analysis by the surface 12, a composite XRD signature is obtained resulting from the combination of the PLA and the authentication material, over the detection/penetration depth.

The authentication layer here is 100% authentication material, but there may be less, in combination with the PLA or another printable polymer. In general, it is possible to have the authentication material in one or several layers, from C1 to the layer Ci located at the detection limit. Indeed, in practice it is possible to act on the presence of authentication material in several layers, to multiply the number of signatures.

Layer C1 may also be made with a thread of authentication material and a polymer-based thread of a different color.

The object of FIG. 11 is a simple tag (flat and oval body) with an identification marking 34 readable by the eye and simply indicating text, which can be the brand of a product or service, or the name of a company. This tag is manufactured by 3D printing with the same materials as for the chip of FIG. 10, and a layer of 100% authentication material has been integrated at a given depth, within the detection limit of the XRD analysis. The layer of identification material has the same surface as the face 34. The XRD analysis can therefore be done at any location of the face 32, in order to obtain the XRD signature of the object.

In another embodiment, the tag can be manufactured from a conventional plastic material (or other materials: wood, leather, fabric, etc.), by printing or not, e.g. PET, PLA, ABS, PA, PEHD, etc., that is to say, not incorporating an inner layer of authentication material. Reference sign 36 designates a circular cavity with a diameter of about 10 to 20 mm and a depth of 100 to 200 µm filled with an ink deposited by screenprinting, indicated by reference 38. Like for example 4 above, the ink is a mixture of compounds of the ink strictly speaking, and authentication material powders. The XRD signature of the object can therefore be determined by XRD analysis at the ink deposition 38. The XRD signature is a composite signature resulting from materials that are present, in particular the ink with the compounds of the ink and the authentication material powders, and the underlying support.

In the variant of FIG. 12, a tag 50 (parallelepipedal body) has been produced by 3D printing that comprises, on its face 52, an identification area having an identification marking 54 of the linear barcode type. During its manufacture, the authentication material has been deposited, at a given depth, over a portion of the surface 52 of the tag 50. More specifically, the authentication material is deposited next to the barcode 54, here at a longitudinal end, in particular to the left of the broken line 56 (virtual line).

The tag thus comprises an identification marking 54, and an authentication area 58 (shown symbolically by the broken rectangle) separate from but adjacent to the identification area 54. The line 56 or the box 58 could be drawn on the face 52 to indicate to the operator where to perform the XRD analysis.

The embodiment of FIG. 13 is carried out based on the same principle as the tag of FIG. 10. Here, it involves a pin 70 printed from PLA in disc form. The surface layer comprises a circular two-dimensional code 74 of the "bleam" type made with two different PLA threads. A layer with 100% authentication material is arranged at a predetermined depth to allow the XRD analysis. The XRD analysis can therefore be done at any location of the face 72 of the pin 70. The code 74 extends only over part of the surface layer. The authentication and identification areas are therefore partially superimposed.

The identification marking represents information that can be of different natures, in particular one or several of the following information items: nature of the object, name, manufacturer reference, regulatory data and information relative to the XRD signature.

Regarding the information relative to the XRD signature, it is possible to include a link pointing to a file or database comprising the reference XRD signature. Alternatively, the reference XRD signature, that is to say, information representing the characteristic peaks (angle, intensity), may be encoded directly in the identification marking.

The results presented above, and in particular the diffractograms, have been obtained with a given x-ray characterization technique, presented above, in particular with a copper x-ray source. It is clear for one skilled in the art that, depending on the analyzed materials/composites, the diffractogram may vary based on the wavelength of the incident X radiation. In order to be able to compare the diffractograms, one will therefore be sure to use similar X characterization techniques, in particular with the same x-ray source (same wavelength). If applicable, information relative to the reference XRD signature may include the wavelength and/or the type of x-ray source to be used.

The invention claimed is:

1. An anti-counterfeiting object, comprising:
 a face with an optical identification marking which is readable by at least one of an eye and a machine, and
 an authentication volume, said authentication volume extending from said face, or from another face of the object, in a thickness (z) direction so as to be accessible from the face from which it extends in order to be read by x-ray diffractometry, XRD;
 wherein the authentication volume is a composite of a first material, referred to as an authentication material, and at least one second material, the authentication volume constituting a material volume of at least 5 mm3; and
 the authentication material comprises at least one amorphous phase, at least one crystalline phase and at least one complex metal phase,
 wherein the optical identification marking comprises information relative to a position of the authentication volume within the object, indicating a location of a measurement zone.

2. The object according to claim 1, wherein the second material has its own XRD signature, different from an XRD signature of the first material.

3. The object according to claim 1, wherein the authentication volume combines the first and second materials, in a non-miscible manner.

4. The object according to claim 3, wherein the authentication volume results from an association, juxtaposition and/or superposition of the first and second materials, contributed separately.

5. The object according to claim 1, wherein the authentication material is present on a surface and/or distributed in the thickness direction.

6. The object according to claim 1, wherein the authentication material is present, in the authentication volume, at a predetermined depth, or at several different predetermined depths relative to a surface.

7. The object according to claim 1, wherein the authentication material occupies a volume of at least 10 mm3.

8. The object according to claim 1, wherein the authentication volume extends from one face to a depth between 0 and 1.5 mm.

9. The object according to claim 1, wherein the authentication volume extends over a surface, taken in a plane substantially parallel to the face of the object from which it extends, of at least 10 mm.

10. The object according to claim 1, wherein, seen in the direction of the thickness, the optical identification marking and the authentication volume are superimposed at least partially, for reading from the face from which the authentication volume extends.

11. The object according to claim 1, wherein the optical identification marking is done from two materials, each having a different color.

12. The object according to claim 1, wherein the identification marking is a two-color matrix marking, a surface layer being made from the first and the second material, each having a different color.

13. The object according to claim 1, wherein the identification marking comprises a series of marks that are representative of a code delimited by a peripheral line, the authentication volume being located inside a contour of this peripheral line.

14. The object according to claim 1, wherein the object is made up of a plurality of superimposed layers formed by 3D printing, at least one of the layers located at a depth between 0 and 0.6 mm from a surface comprising at least part of the authentication material.

15. The object according to claim 1, wherein the information comprised by the optical identification marking comprises measurement coordinates to perform a XRD analysis.

16. A method for manufacturing an anti-counterfeiting object according to claim 1, wherein said object is made by additive construction using a filament of authentication material comprising at least one amorphous phase, at least one crystalline phase and at least one complex metal phase, and at least one polymer-based filament of a different color, wherein said object is formed by successive printing of a plurality of layers, a surface layer being printed so as to form an identification marking and the material of the filament of authentication material being deposited in the surface layer and/or in one or a plurality of layers below the surface layer so as to form an authentication volume.

17. A method for authenticating an anti-counterfeiting object according to claim 1, comprising:
 reading the identification marking of the anti-counterfeiting object using a reading instrument in order to obtain information;
 analyzing, by x-ray diffractometry, XRD, the authentication volume of the anti-counterfeiting object in order to determine its XRD signature;
 comparing the XRD signature of the anti-counterfeiting object with a reference XRD signature.

18. The method according to claim 17, wherein said identification marking comprises information regarding positions and intensities of characteristic peaks relative to said reference XRD signature.

19. The method according to claim 17, wherein said reference XRD signature is obtained from a database.

20. A method for manufacturing an anti-counterfeiting object according to claim 1, wherein at least part of the object is manufactured by mixing, in a non-miscible manner, a first material, referred to as authentication material, and at least one second material so as to form an authentication volume, said authentication volume extending from a face of the object in the thickness (z) direction so as to be accessible from this face in order to be read by x-ray diffractometry, XRD, and the object also includes, on this face or another face, an optical identification marking that is readable by the eye and/or by a machine;

and the authentication material comprises at least one amorphous phase, at least one crystalline phase and at least one complex metal phase.

21. The method according to claim 20, wherein the first and second materials are added separately to form the authentication volume, in which they are associated, juxtaposed and/or superimposed.

22. The method according to claim 20, wherein the first and second materials are combined so as to control their respective volumes and positions in the authentication volume.

23. The object according to claim 1, wherein the authentication volume extends from one face to a depth between 0 and 1 mm.

24. The object according to claim 1, wherein the authentication volume extends from one face to a depth between 0 and 0.6 mm.

* * * * *